Oct. 10, 1950  E. B. BALDRIDGE ET AL  2,524,749
THRUST INDICATOR FOR JET ENGINES
Filed Dec. 27, 1946
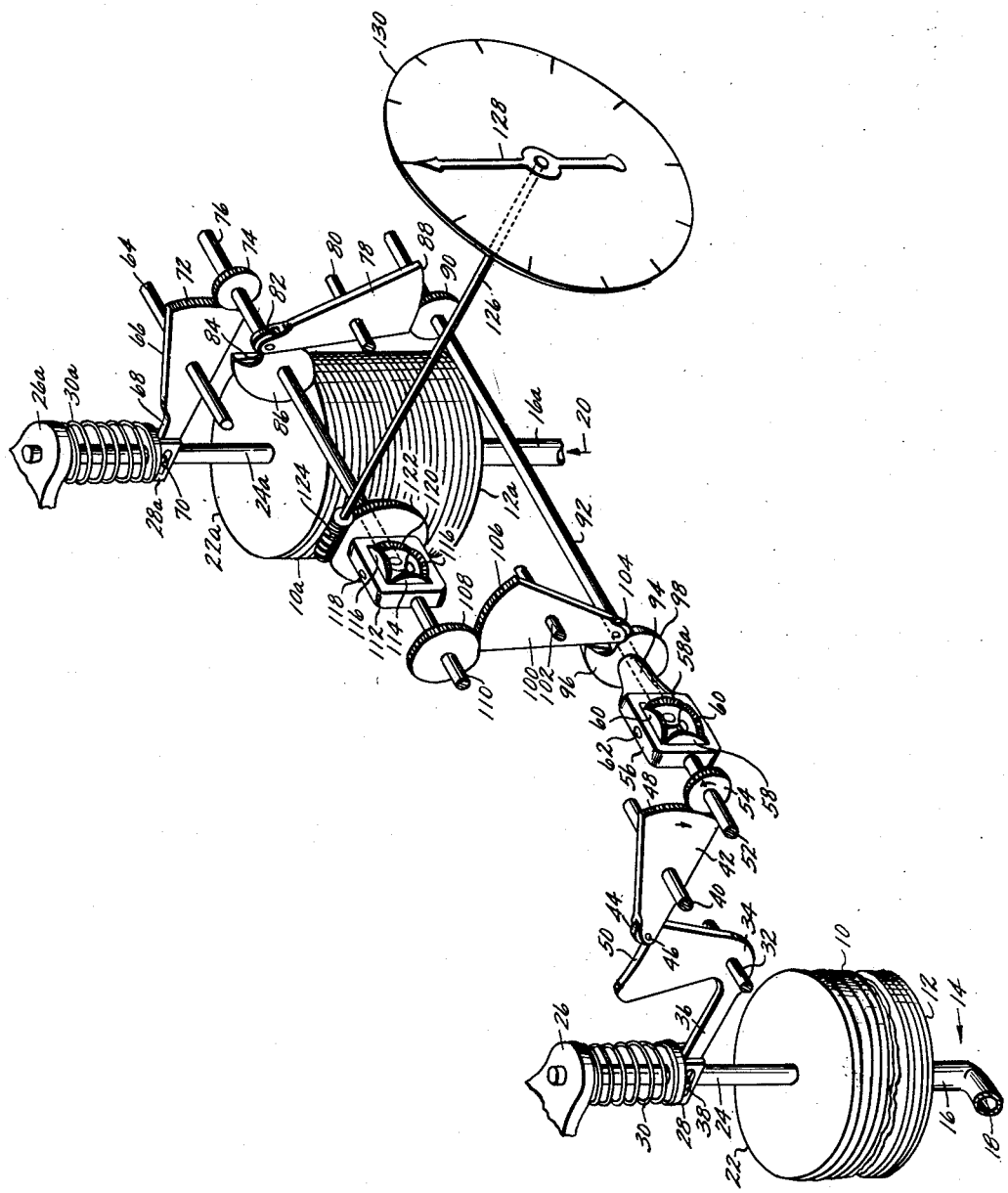
INVENTORS
ROBERT N. GREEN
ERNEST B. BALDRIDGE
BY
ATTORNEYS Patented Oct. 10, 1950

2,524,749

UNITED STATES PATENT OFFICE 2,524,749

THRUST INDICATOR FOR JET ENGINES

Ernest B. Baldridge, Dayton, Ohio, and Robert N. Green, New York, N. Y.

Application December 27, 1946, Serial No. 718,722

6 Claims. (Cl. 73—115)

(Granted under the act of March 3, 1883, as amended April 30, 1928; 370 O. G. 757)

The invention described herein may be manufactured and used by or for the Government for governmental purposes without payment to us of any royalty thereon.

This invention relates to thrust indicators and is particularly adapted to determine the thrust output of a jet propulsion aircraft engine on the ground or in flight.

An object of the invention is to provide, in a single instrument, means visible to the pilot in the cockpit for indicating directly and without additional calculation the total thrust output of the jet engine, whereby the pilot may ascertain whether the requisite power for take-off and in-flight performance is available.

More specifically, an object of the invention is to reduce the basic equation for the total thrust to its simplest form then provide mechanical means to solve the equation and visibly indicate the total thrust existing at any time to the pilot.

Other objects and advantages will become evident as the invention is further described with reference to the drawing which is a single view in perspective showing a schematic representation of the mechanism employed in one embodiment of the invention.

The basic and more or less empirical equation for obtaining the total thrust output of a jet propulsion engine is $$T = 8.06 A P_s \left[ \left( \frac{P_t}{P_s} \right)^{\frac{\gamma-1}{\gamma}} - 1 \right] K$$

Wherein

T = total thrust
A = tailpipe area
$P_t$ = total pressure
$P_s$ = static pressure
$\gamma = 1.33 = C_p/C_v$
K = calibration factor Since A and K are constant for a given aircraft, let $8.06 \, AK = C$ and $$\frac{\gamma-1}{\gamma} = \frac{.33}{1.33} = .248$$

whereby $$T = CP_s \left[ \left( \frac{P_t}{P_s} \right)^{.248} - 1 \right]$$

or $$T = CP_s [(P_t^{.248} P_s^{-.248}) - 1]$$

or $$T = C(P_t^{.248} P_s^{.752} - P_s)$$

This equation is solved mechanically and the result indicated visibly by the mechanism hereinafter described. This mechanism comprises means to measure the total pressure $P_t$; means to measure the static pressure $P_s$; means responsive to the measure of $P_t$ to set up the logarithm of $P_t^{.248}$; means responsive to the measure of $P_s$ to set up the logarithm of $P_s^{.752}$; means to add the logarithm of $P_t^{.248}$ to the logarithm of $P_s^{.752}$; means to convert the sum of the logarithms of $P_t^{.248}$ and $P_s^{.752}$ to the antilogarithm; means to subtract the static pressure $P_s$ from the antilogarithm, and means to indicate the result of the calculation in terms of total thrust T.

In the drawing, a "sylphon" bellows 10 has the end 12 fixed with respect to the aircraft, and has a Pitot tube 14 extending first axially as at 16 from the fixed end 12 then forwardly as at 18 into the tail pipe stream, whereby it measures the impact pressure and superimposes it onto the static pressure in the usual manner. The total pressure, thus measured, is represented by $P_t$ in the equation.

A second "sylphon" bellows 10a also has the end 12a fixed with respect to the aircraft, and has a piezometer tube 20 extending axially as at 16a from the fixed end 12a and into the tail pipe stream at right angles thereto, whereby it measures the static pressure in the tail pipe in the usual manner. The static pressure, thus measured, is represented by $P_s$ in the equation. For simplicity in design, like pressures may preferably produce the same axial movement in both bellows.

The upper end 22 of the bellows 10 is movable axially from pressure within the bellows. A rod 24 is fixed on the movable end 22 and is provided at the upper end with a guide 26 which is fixed with respect to the aircraft. A spring support 28 is fixed to the rod 24 and takes the reaction of the lower end of a compression spring 30, the reaction of the upper end being taken by the guide 26. The compression spring 30 is so proportioned that it holds the movable end of the bellows 10 at the minimum value of $P_t$ when the engine is idling.

The upper end 22a of the bellows 10a is also movable axially and is provided with a rod 24a, guide 26a, support 28a and spring 30a proportioned and arranged in the same manner and for the same purpose as indicated with respect to the bellows 10.

Units of pressure within the bellows 10 and 10a will be translated into units of linear movement of the rods 24 and 24a, the linear movement for a given pressure depending on the algebraic sum of the resistances of the springs 30 or 30a and the "sylphon" 10 or 10a at any given point in Sylphon expansion.

Mounted on a shaft 32 to rock thereon is a logarithmic cam 34 which has an arm 36 engaged by a pin 38 with the spring support 28, whereby axial movement of the rod 24 rocks the cam 34.

Mounted on a shaft 40 is a rocking lever 42 which, at one end, carries a roller 44 rotatable on the pin 46 and at the other end has a gear segment 48 formed thereon. The roller 44 rolls on the working surface 50 of the cam 34.

Carried on a shaft 52 is a spur pinion 54 which is in mesh with the gear segment 48.

The shaft 52 revolves freely in a differential frame or housing 56 and, at the inner end within the housing 56, carries a bevel gear 58 which is in mesh with the bevel pinions 60 which are freely rotatable on studs 62 carried by the housing. A second bevel gear 58a is freely rotatable within the frame or housing 56 and is in mesh with the bevel pinions 60. If, during the anticlockwise rotation of the bevel gear 58, the bevel gear 58a remains nonrotative, the frame 56 will rotate anticlockwise through an angle equal to ½ of the angle of rotation of the bevel gear 58. On the other hand, if both bevel gears 58 and 58a rotate anticlockwise through an equal part of a turn, the frame 56 during the same time will rotate through the same part of a turn as the bevel gears. For convenience in illustration, the several parts may be so proportioned that while the bellows 10 moves the rod 24 from zero position to maximum, the bevel gear 58 will rotate some selected portion of a complete turn. In practice, the gear segment 48 and the pinion 54 had preferably be so proportioned that the extreme travel of the bellows rod 24 will rotate the bevel gear 58 not more than ¾ turn, whereby the frame 56 will in no case be rotated more than ¾ turn even though both bevel gears revolve equally in the same direction. This limitation is necessary because a cam 96, hereinafter described, the maximum rotation of which is less than one turn, is fast on the frame 56 to rotate therewith.

A simple method of plotting the logarithmic cam surface 50 may consist of dividing the zero-to-maximum movement of the rod 24 into any convenient number of positions, ascertaining the $P_t$ values required to move the rod to each position, considering the selected part of a turn of the bevel gear 58 to represent $\log (P_t^{.248})$ at maximum $P_t$, then forming the intermediate positions on the surface 50 to $\log (P_t^{.248})$ for the intermediate values of $P_t$.

Mounted on a shaft 64 is a rocking lever 66 which has an arm 68 engaged by a pin 70 with the spring support 28a, whereby the axial movement of the rod 24a rocks the rocking lever 66. A gear segment 72 is formed on the other end of the lever 66.

A spur pinion 74 is fast on a rotatable shaft 76 and is in mesh with the gear segment 72. A rocking lever 78, rockable on a shaft 80, is provided at one end with a roller 82 which is in rolling contact with the working surface 84 of a logarithmic cam 86 which is fast on the shaft 76. The other end of the rocking lever 78 has a gear segment 88 formed thereon. A pinion 90 is secured to a shaft 92 and is in mesh with the gear segment 88. The leftward end of the shaft 92 has rotative bearing in a hub 94 on the differential housing 56 and is drivably secured in the bevel gear 58a.

The working surface 84 of the logarithmic cam 86 may preferably be so shaped that for any value of $P_s$ to which the rod 24a has been moved, the bevel gear 58a will be rotated anticlockwise an amount equal to $\log (P_s^{.752})$. Since the bevel gear 58 was coincidentally rotated anticlockwise an amount equal to $\log (P_t^{.248})$ the differential housing 56 will rotate anticlockwise log $$\log (P_t^{.248}) + \log (P_s^{.752})$$

or $$.248 (\log P_t) + .752 (\log P_s)$$

the amount of rotation of the differential housing 56 thus representing the sum of the logs of the values in the equation which are to be multiplied.

Fast on the hub 94 of the housing 56 is a cam 96 with an antilog working surface 98. A rocking lever 100 is mounted on a shaft 102 and, at one end, carries a roller 104 in rolling contact with the working surface 98, and at the other end has a gear segment 106 formed thereon. Gear 108 in mesh with the gear segment 106 is fast on the shaft 110 which has rotative bearing in a differential housing 112. A bevel gear 114 within the housing 112 is also fast on the shaft 110. Bevel pinions 116 rotate freely on studs 118 in the housing 112 and are in mesh with the bevel gear 114. A second bevel gear 120, also in mesh with the pinions 116 is fast on the shaft 76.

Since the antilog cam 96 rotates the bevel gear 114 clockwise an amount equal to $(P_t^{.248} P_s^{.752})$, and the shaft 76 rotates the bevel gear 120 anticlockwise an amount equal to $P_s$, it follows that the housing will be rotated the algebraic sum of the clockwise and anticlockwise rotations, that is $(P_t^{.248} P_s^{.752} - P_s)$.

By employing a pair of bellows whereby equal pounds pressure will provide equal axial expansion, (1) the proportion of the cam 34, lever 42, segment 48 and pinion 54 may preferably be such that maximum expansion of bellows 22 will produce ¾ turn anticlockwise rotation of the bevel gear 58; (2) the proportion of the lever 66, segment 72, and pinion 74 may preferably be such that an equal expansion of bellows 22a will produce ¾ turn anticlockwise rotation of the bevel gear 120; (3) the proportion of the cam 86, lever 78, segment 88 and pinion 90 may preferably be such that ¾ turn anticlockwise of the cam 86 will produce ¾ turn anticlockwise of the bevel gear 58a; (4) the proportion of the cam 98, lever 100, segment 106 and pinion 108 may preferably be such that ¾ turn anticlockwise of the cam 96 will produce ¾ turn clockwise of the bevel gear 114.

Obviously since the bevel gear 58 receives anticlockwise rotation through the logarithmic cam 34, and since the bevel gear 58a receives anticlockwise rotation through the logarithmic cam 86, the logarithmic values of the axial movement of the rods 24 and 24a will be added, the addition of the logarithmic values being recorded on frame 56.

Since the bevel gear 114 receives clockwise rotation through the antilog cam 96, and since the bevel gear 120 receives anticlockwise rotation through the lever 66, segment 72, pinion 74 and shaft 76, which are not influenced by the logarithmic cam 86, the numerical values set up on bevel gears 114 and 120 will be subtracted.

Secured to the end of the differential housing 112 is a helical gear 122. A second helical gear 124, meshed with the gear 122, imparts the rotation of the differential housing 112 to the shaft 126, and, through the shaft, to an indicating pointer 128. The factor C in the equation may be taken care of by making the gear 124 rotate C times the number of turns of the gear 122, or, the factor C may be applied in the graduation on the face of the dial. The dial 130 will be graduated in terms of thrust.

Having described an embodiment of our invention, we claim:

1. A device for indicating the total thrust in the tailpipe of a jet propulsion engine as expressed by T in the equation $T=C(P_t{}^{.248} P_s{}^{.752}-P_s)$ which comprises, in combination, a first bellows having one end fixed and the other end movable in response to a change in the total pressure as expressed by $P_t$ in the equation, a second bellows having one end fixed and the other end movable in response to a change in the static pressure as expresesd by $P_s$ in the equation, a first differential housing, a first differential gear and a second differential gear in said first differential housing, differential pinions rotatable in said housing connecting said gears, a first linkage operatively connecting the first bellows and the first differential gear for anticlockwise rotation of said first differential gear, said first linkage including a first logarithmic cam so constructed and arranged that movement of the movable end of the first bellows to a given value of $P_t$ moves the first differential gear an amount equal to $.248(\log P_t)$, a second linkage operatively connecting the second bellows and the second differential gear for anticlockwise rotation of said second differential gear, said second linkage including a second logarithmic cam so constructed and arranged that movement of the movable end of the second bellows to a given value of $P_s$ moves the second differential gear an amount equal to $.752(\log P_s)$, whereby said first differential housing rotates an amount equal to $$.124(\log P_t + .376(\log P_s)$$

a second differential housing, a third differential gear and a fourth differential gear in said second differential housing, differential pinions rotatable in said second differential housing connecting said third and fourth gears, a third linkage including an antilogarithmic cam operatively connecting the first differential housing to the third differential gear for clockwise rotation of said third differential gear, means included in said second linkage operatively connecting the second bellows to the fourth differential gear for anticlockwise rotation of said fourth differential gear, a dial graduated in values of T, a pointer for said dial, a shaft to rotate said pointer, and gearing connecting said second differential housing to said shaft, said gearing having a driver-to-driven ratio of 1 to C.

2. A mechanism for indicating the total thrust in the tailpipe of a jet propulsion engine as expressed by the equation $T=C(P_t{}^{.248} P_s{}^{.752}-P_s)$ which comprises, in combination, a first bellows having one end fixed and the other end movable in response to a change in the value of $P_t$, a second bellows having one end fixed and the other end movable in response to a change in the value of $P_s$, a first differential housing, a first differential gear and a second differential gear in said first differential housing, linkage including a first logarithmic cam operatively connecting the first bellows and the first differential gear for anticlockwise rotation of said first differential gear so constructed and arranged that movement of the first bellows to a given value of $P_t$ moves the first differential gear an amount equal to $.248(\log P_t)$, linkage including a second logarithmic cam operatively connecting the second bellows and the second differential gear for anticlockwise rotation of said second differential gear so constructed and arranged that movement of the second bellows to a given value of $P_s$ moves the second differential gear an amount equal to $.752(\log P_s)$, whereby said first differential housing rotates an amount equal to $$.124(\log P_t) + .376(\log P_s)$$

a second differential housing, a third differential gear and a fourth differential gear in said second differential housing, linkage including an antilogarithmic cam operatively connecting the first differential housing to the third differential gear for clockwise rotation of said third differential gear, means including a portion of the second said linkage operatively connecting the second bellows to the fourth differential gear for anticlockwise rotation of said fourth differential gear, a dial graduated in values of T, an indicator for said dial, and gearing connecting said second differential housing to said indicator, said gearing having a driver-to-driven ratio of 1 to C.

3. A mechanism for solving the equation $$T=C(P_t{}^{.248} P_s{}^{.752}-P_s)$$

which comprises, in combination, a first pressure measuring means movable in response to a change in the value of $P_t$, a second pressure measuring means movable in response to a change in the value of $P_s$, a first differential gear set which includes a first differential housing, a first differential gear and a second differential gear, linkage including a first logarithmic means operatively connecting the first pressure measuring means and the first differential gear to rotate said first differential gear in one direction so constructed and arranged that movement of the first pressure measuring means to a given value of $P_t$ moves the first differential gear an amount equal to $.248(\log P_t)$, linkage including a second logarithmic means operatively connecting the second pressure measuring means and the second differential gear to rotate said second differential gear in the same direction as the first differential gear rotates so constructed and arranged that movement of the second pressure measuring means to a given value of $P_s$ moves the second differential gear an amount equal to $.752(\log P_s)$, whereby said first differential housing rotates an amount equal to $.124(\log P_t) + .376(\log P_s)$, a second differential gear set comprising a second differential housing, a third differential gear and a fourth differential gear in said second differential housing, linkage including an antilogarithmic means operatively connecting the first differential housing to the third differential gear for rotation of said third differential gear opposite to the first and second differential gears, means actuable by movement of said second pressure measuring means to rotate the fourth differential gear in the same direction as the first and second differential gears, a dial graduated in values of T, an indicator for said dial, and gear means for connecting said second differential housing to said indicator, having a driver-to-driven ratio of 1 to C.

4. A mechanism for solving the equation $T=C(P_t{}^{.248} P_s{}^{.752}-P_s)$ which comprises, in combination, a first pressure measuring means movable in response to a change in the value of $P_t$, a second pressure measuring means moval response to a change in the value of $P_s$, a first differential, a first differential frame, a first differential shaft and a second differential shaft extending from said first differential frame, a first differential mechanism connecting said shafts, a first linkage including a first logarithmic means operatively connecting the first pressure measuring means and the first differential shaft for rotation of said first differential shaft in one direction so constructed and arranged that movement of the first pressure measuring means to a given value of $P_t$ moves the first differential shaft an amount equal to .248(log $P_t$), a second linkage including a second logarithmic means operatively connecting the second pressure measuring means and the second differential shaft for rotation of said second differential shaft in the same direction as said first differential shaft so constructed and arranged that movement of the second pressure measuring means to a given value of $P_s$ moves the second differential shaft an amount equal to .752(log $P_s$), whereby said first differential frame rotates an amount equal to $$.124(\log\ P_t) + .376(\log\ P_s)$$

a second differential, a second differential frame, a third differental shaft and a fourth differential shaft extending from said second differential frame, a second differential mechanism connecting said third and fourth differential shafts, a third linkage including an antilogarithmic means operatively connecting the first differential frame to the third differential shaft for rotation of said third differential shaft in the other direction, means associated with said second linkage operatively connecting the second pressure measuring means to the fourth differential shaft for rotation of said fourth differential shaft in said one direction, a dial graduated in values of T, an indicator for said dial, and gearing drivably connecting said second differential frame to said indicator.

5. A mechanism for solving the equation $T=C(P_t{}^x P_s{}^y - P_s)$ which comprises pressure means movable to measure the value of $P_t$, a second pressure means movable to measure the value of $P_s$, a differential frame, differentially movable members in said frame, one drivably connected to $P_t$ and the other drivably connected to $P_s$, logarithmic means included in each said drive for causing the several pressure means to move their respective differential members an amount equal to $x(\log P_t)$ and $y(\log P_s)$, whereby said frame moves an amount equal to $\frac{1}{2}x(\log\ P_t) + \frac{1}{2}y(\log\ P_s)$, a second differential frame, differentially movable members in said second frame one drivably connected to the first frame and the other drivably connected to the second pressure means the ratio of the second frame drives being equal, antilogarithmic means in the drive which connects the first frame to one of said differentially movable members in said second frame, an indicator, and means connecting the second frame to the indicator.

6. A mechanism for multiplying one quantity by a second then subtracting one of said quantities from the result, which comprises, means movable to set up the value of one of the quantities, a second means movable to set up the value of the other of said quantities, a first differential frame, first and second differentially movable members in said first differential frame the first differentially movable member being drivably connected to the first said movable means and the second differentially movable member being drivably connected to the said second movable means the ratio of the first and second drives being equal, logarithmic means included in each said drive for causing the several movable means to move their respective differentially movable members in accordance with the logarithms of the several quantities, whereby said frame moves through a distance of one-half the logarithm of one of said quantities plus one-half the logarithm of the other of said quantities, a second differential frame, third and fourth differentially movable members in said second frame, the third differentially movable member being drivably connected to the first frame and the fourth drivably connected to said second movable means the ratio of the third and fourth drives being equal, antilogarithmic means in the second drive which connects the first frame to one of the differentially movable members in the second frame, an indicator, and means connecting said second frame to the indicator.

ERNEST B. BALDRIDGE.
ROBERT N. GREEN.

REFERENCES CITED

The following references are of record in the file of this patent:

UNITED STATES PATENTS

| Number | Name | Date |
|---|---|---|
| 1,889,876 | Pellerin et al. | Dec. 6, 1932 |
| 2,444,549 | Anderson | July 6, 1948 |